United States Patent Office 3,016,385
Patented Jan. 9, 1962

3,016,385
METHOD OF PREPARING GLYOXAL HYDRATE
Jean-Claude Bondiou, Gentilly, and Bernard J. Petusseau, Paris, France, assignors to Société Nobel Bozel, Paris, France, a French company
No Drawing. Filed June 1, 1956, Ser. No. 588,610
Claims priority, application France June 10, 1955
4 Claims. (Cl. 260—340.6)

It is known that a mixture of glyoxal polyhydrates can be prepared either by evaporation at atmospheric pressure or under vacuum or by atomisation of glyoxal solutions.

These products, which correspond to a dehydration of glyoxal dihydrate existing in solution

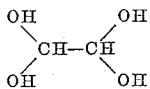

are mixtures of ill-defined products for which formula such as the following have been proposed:

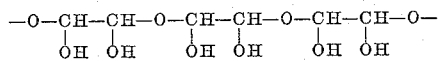

or again

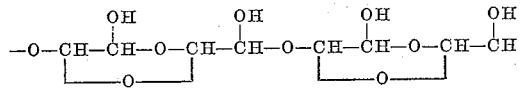

These products are amorphous and dissolve more or less rapidly in water according to their degree of dehydration. Their glyoxal content (CHO—CHO) varies between 65 and 85%. These products include the impurities already existing in the initial glyoxal solution (in general organic acids and their salts) and are hygroscopic.

We have now found that it is possible to obtain a crystalline and non-hygroscopic product, which is capable of being dissolved very easily in water with the formation of a very pure aqueous solution of glyoxal.

To do this it suffices to heat moderately an aqueous solution of glyoxal having a glyoxal content in excess of 30% by weight then, preferably after seeding with at least one crystal from a previous operation, to alloy the crystallisation of the desired product in the solution, after which the product may be separated by normal methods. It is desirable, for the crystallisation, to maintain the solution at a temperature below that to which it was previously heated. In addition, it is advantageous to start with solutions of glyoxal which are as concentrated as possible, in particular solutions having a glyoxal content in the region of 60% by weight.

The product thus obtained has a composition which corresponds to that of a crystalline hydrate of glyoxal having the formula: $3(CHO-CHO).2H_2O$, i.e. in which the content of pure glyoxal is 82.8%. Although the molecular structure of the product has not yet been determined with absolute certainty, there is reason to believe that this product is a tetrahydroxynaphthodioxane. It is probable that the heating of the initial concentrated solution has the effect of causing a molecular rearrangement corresponding to the union, with cyclisation, of two molecules of water and of three molecules of glyoxal.

The invention is not, however, confined to these explanations.

A considerable advantage of the invention is that it is possible to obtain directly, even starting with impure solutions, a solid crystalline product of high purity which is completely free from hydroscopicity and which, being very soluble in water, allows pure solutions of glyoxal to be obtained for industrial use. The invention can therefore be considered as comprising a process for the purification of aqueous solutions of glyoxal, this process having the advantage of needing only a small consumption of heat.

The following example illustrates the invention.

Example 100 kgs. of a solution of glyoxal concentrated to 60%, containing 60 kgs. of glyoxal, 1.8 kgs. of acetic acid, 2 kgs. of glyoxylic acid and 2 kgs. of glycollic acid are maintained at a temperature of 40° C. for four hours. There is then introduced 0.250 kg. of crystals coming from a previous operation and serving for inoculation.

The solution containing these crystals in suspension is then maintained at a temperature of from 15° to 20° C. until a thick paste of crystals is obtained, which is then filtered.

50 kgs. of crystals of glyoxal hydrate are obtained. The mother liquor containing 36% of glyoxal may be concentrated to 60% for use in a further operation.

What we claim is:
1. A method of preparing a crystalline product having a composition corresponding to a glyoxal hydrate comprising the steps of subjecting an aqueous solution of glyoxal having a glyoxal content of at least 30% by weight to a moderate heating at about 40° C. and thereafter allowing crystallisation of the desired product to take place in the solution at a temperature which is lower than that of said heating.

2. A method of preparing a crystalline product having a composition corresponding to a glyoxal hydrate comprising the steps of subjecting an aqueous solution of glyoxal having a glyoxal content in the region of 60% by weight and a minor content of acetic acid, glyoxylic acid and glycollic acid to a moderate heating at a temperature of 40° C. and thereafter allowing crystallisation of the desired product to take place in the solution at a temperature which is lower than that of said heating.

3. A method of preparing a crystalline product having a composition corresponding to a glyoxal hydrate comprising the steps of subjecting an aqueous solution of glyoxal having a glyoxal content in the region of 60% by weight to a moderate heating at about 40° C. for about four hours, maintaining the solution at a temperature of 15 to 20° C. until a thick paste of crystal has formed and then filtering the product.

4. The process of claim 3, comprising the additional step of seeding said solution with at least one crystal from a previous operation after said solution has been subjected to said moderate heating.

References Cited in the file of this patent
FOREIGN PATENTS
653,588    Great Britain _____ May 16, 1951

OTHER REFERENCES
Avery Adrian Morton: Laboratory Technique in Organic Chemistry, McGraw-Hill, New York, 1938, p. 44; p. 154.
Raudnitz: Chemistry and Industry, 1944, page 327.
Beilstein, Band I, page 760.